US012764476B2

(12) United States Patent
Pedersen et al.

(10) Patent No.: US 12,764,476 B2
(45) Date of Patent: Oct. 13, 2026

(54) HEARING AID CONFIGURED TO SELECT A REFERENCE MICROPHONE

(71) Applicant: Oticon A/S, Smørum (DK)

(72) Inventors: Michael Syskind Pedersen, Smørum (DK); Jesper Jensen, Smørum (DK); Christian Asp Mogensen, Smørum (DK)

(73) Assignee: OTICON A/S, Smørum (DK)

( * ) Notice: Subject to any disclaimer, the term of this patent is extended or adjusted under 35 U.S.C. 154(b) by 147 days.

(21) Appl. No.: 18/819,829

(22) Filed: Aug. 29, 2024

(65) Prior Publication Data

US 2024/0422481 A1 Dec. 19, 2024

Related U.S. Application Data

(63) Continuation of application No. 18/347,690, filed on Jul. 6, 2023, now Pat. No. 12,108,215, which is a (Continued)

(30) Foreign Application Priority Data

Feb. 9, 2021 (EP) .................................... 21156046

(51) Int. Cl.
*H04R 25/00* (2006.01)

(52) U.S. Cl.
CPC ......... *H04R 25/405* (2013.01); *H04R 25/353* (2013.01); *H04R 25/407* (2013.01); *H04R 2225/021* (2013.01); *H04R 2225/025* (2013.01)

(58) Field of Classification Search
CPC .. H04R 25/405; H04R 25/353; H04R 25/407; H04R 2225/021; H04R 2225/025
See application file for complete search history.

(56) References Cited

U.S. PATENT DOCUMENTS

| | | |
|---|---|---|
| 5,715,319 A | 2/1998 | Chu |
| 6,236,731 B1 | 5/2001 | Brennan et al. |

(Continued)

FOREIGN PATENT DOCUMENTS

| | | |
|---|---|---|
| GB | 2540175 A | 1/2017 |
| WO | WO 2017/157803 A1 | 9/2017 |

OTHER PUBLICATIONS

Extended European Search Report issued in Application No. 21156046.1 dated Jul. 13, 2021.

*Primary Examiner* — Suhan Ni
(74) *Attorney, Agent, or Firm* — Birch, Stewart, Kolasch & Birch, LLP

(57) ABSTRACT

A hearing aid adapted for being worn by a user comprises at least two microphones, providing respective at least two electric input signals representing sound; a filter bank converting the at least two electric input signals into signals as a function of time and frequency; a directional system connected to said at least two microphones and being configured to provide a filtered signal in dependence of said at least two electric input signals and fixed or adaptively updated beamformer weights. At least one direction to a target sound source is defined as a target direction. For each frequency band, one of said at least two microphones is selected as a reference microphone, thereby providing a reference input signal for each frequency band. The reference microphone for a given frequency band may be selected in dependence of directional data related to directional characteristics of the at least two microphones.

20 Claims, 6 Drawing Sheets

Related U.S. Application Data continuation of application No. 17/667,293, filed on Feb. 8, 2022, now Pat. No. 11,743,661.

(56) References Cited

U.S. PATENT DOCUMENTS

| | | | | |
|---|---|---|---|---|
| 7,274,794 | B1 | 9/2007 | Rasmussen | |
| 2001/0031053 | A1 | 10/2001 | Feng et al. | |
| 2003/0012391 | A1* | 1/2003 | Armstrong | H04R 25/407 381/317 |
| 2003/0063759 | A1 | 4/2003 | Brennan et al. | |
| 2004/0240681 | A1 | 12/2004 | Fischer | |
| 2012/0308060 | A1* | 12/2012 | Pontoppidan | H04R 25/505 381/317 |
| 2013/0223644 | A1 | 8/2013 | Van Hoesel et al. | |
| 2015/0063614 | A1* | 3/2015 | Petersen | H04R 25/30 381/318 |
| 2015/0317999 | A1 | 11/2015 | Gao | |
| 2017/0099550 | A1 | 4/2017 | Blessing et al. | |

* cited by examiner

HEARING AID CONFIGURED TO SELECT A REFERENCE MICROPHONE

This application is a Continuation of copending application Ser. No. 18/347,690, filed Jul. 6, 2023, which is a Continuation of application Ser. No. 17/667,293, filed on Feb. 8, 2022 (now U.S. Pat. No. 11,743,661 issued Aug. 29, 2023), which claims priority under 35 U.S.C. § 119(a) to Application No. 21156046.1, filed in Europe on Feb. 9, 2021, all of which are hereby expressly incorporated by reference into the present application.

SUMMARY

The present application relates to the field of hearing aids, specifically to a hearing aid comprising a multitude (e.g. ≥2) of input transducers (e.g. microphones) and a directional system (beamformer) for providing a (spatially) filtered (beamformed) signal based on signals from the input transducers (and predetermined or adaptively updated) filter weights.

A Hearing Aid:

In an aspect of the present application, a hearing aid adapted for being worn by a user at or in an ear of the user, or to be partially or fully implanted in the user's head at an ear of the user, is provided. The hearing aid comprises

- at least two microphones, providing respective at least two electric input signals representing sound around the user wearing the hearing aid;
- a filter bank converting the at least two electric input signals into signals as a function of time and frequency, e.g. represented by complex-valued time-frequency units;
- a directional system connected to said at least two microphones and being configured to provide a filtered signal in dependence of said at least two electric input signals and fixed or adaptively updated beamformer weights; and
- at least one direction to a target sound source being defined as a target direction.

The hearing aid may be configured to provide that for each frequency band, one of said at least two microphones—at a given point in time—is selected as a reference microphone, thereby providing a reference input signal for each frequency band. The hearing aid may be further configured to provide that the reference microphone is different for at least two frequency bands.

Thereby a hearing aid with improved beamforming may be provided.

The reference microphone may e.g. be selected off-line, e.g. if the target direction is fixed. The reference microphone may e.g. be selected in advance of operation (pre-defined) but be different for different frequency bands. In other words, the reference microphone is pre-selected for a given frequency band but may vary across the frequency bands.

The reference microphone for a given frequency band may be adaptively selected. The reference microphone for a given frequency band may be adaptively selected based on a logic criterion. The logic criterion may be predefined. The logic criterion may be updated in dependence of a current acoustic environment. The logic criterion may be selectable from a user interface.

The reference microphone may be (and will typically be) a real (physical) microphone. In certain situations, the (reference) signal from the reference microphone may be time-shifted in order to align the time delay difference from the target direction across frequency channels. I.e. the reference microphone still has the norm=1, but a time shift may be applied to the two microphones in a given frequency channel in order to align the arrival time of the target signal.

The hearing aid may comprise a memory, or circuitry for establishing a communication link to a database, comprising directional data related to directional characteristics of said at least two microphones. The logic criterion may comprise that the reference microphone for a given frequency band is adaptively selected based on the directional data. The directional data may comprise a directivity index or a front-back ratio. The directional data may be stored in the memory or database and may comprises frequency dependent values of the directivity index or front-back ratio for different target directions.

The logic criterion may comprise a comparison of estimated relative transfer functions for the at least two microphones. For a given frequency band k, the reference microphone may be selected as the microphone, which picks up most energy from the target direction. For a given frequency band k, the reference microphone may be selected as the microphone, which has the largest relative transfer function for the target direction, e.g. the largest magnitude among the elements of the relative transfer function. The reference microphone will in such case be selected as the microphone exhibiting the largest relative transfer function for the target direction to another microphone in the given frequency band.

In case the at least two microphones comprise two or more microphones, or more than two microphones, the reference microphone for a given frequency band k may be adaptively selected based on a maximum of the directional data of each microphone. The reference microphone for a given frequency band k, may e.g. be selected as the microphone exhibiting maximum directivity index (DI), maximum front-back-ration (FBR), maximum transfer function, etc., at a given point in time (for the target sound source of current interest to the user (impinging on the hearing aid from a specific direction at said given point in time)).

The reference microphone for a given frequency band k may be (e.g. adaptively) selected based on a maximum of the directional data of each microphone.

The reference microphone for a given frequency band k may be (e.g. adaptively) selected based on a maximum of the target directivity of each microphone. The term 'the target directivity' may in the present disclosure be understood not only as the directivity for a single direction, but also the directivity across a broader range of directions, e.g. having the highest front-back ratio.

The reference microphone for a given frequency band k may be (e.g. adaptively) selected based on a maximum directivity of each microphone for a given target direction.

The reference microphone for a given frequency band k may be (e.g. adaptively) selected based on a maximum directivity of each microphone for a broader range of target directions. The reference microphone for a given frequency band k may be adaptively selected as the microphone having the highest front back ratio in the given frequency band.

The reference microphone for a given frequency band k, may e.g. be (e.g. adaptively) selected as the microphone exhibiting maximum directivity index (DI) or the maximum front-back-ratio (FBR), at a given point in time (for the target sound source of current interest to the user (impinging on the hearing aid from the target direction at said given point in time)).

In an aspect, a hearing aid adapted for being worn by a user at or in an ear of the user or to be partially or fully implanted in the user's head at an ear of the user, is provided by the present disclosure. The hearing aid comprises

- at least two microphones, providing respective at least two electric input signals representing sound around the user wearing the hearing aid;
- a filter bank converting the at least two electric input signals into signals as a function of time and frequency, e.g. represented by complex-valued time-frequency units;
- a directional system connected to said at least two microphones and being configured to provide a filtered signal in dependence of said at least two electric input signals and fixed or adaptively updated beamformer weights; and
- a direction to a target sound source being defined as a target direction.

For each frequency band, one of said at least two microphones—at a given point in time—is selected as a reference microphone, thereby providing a reference input signal for each frequency band. The reference microphone for a given frequency band may be selected as the microphone exhibiting maximum directivity index or maximum front-back-ratio, at the given point in time, for target sound impinging on the hearing aid from the target direction at said given point in time.

As indicated in FIG. 3A, 3B, 3C, for a given direction of arrival of sound relative to the hearing aid, the microphone having the highest directivity index towards the given direction changes across frequency bands. It is thus an advantage to select the reference microphone which has the highest directivity index for a given direction in a given frequency band.

The directional system may comprise a minimum variance distortionless response (MVDR) beamformer.

The directional system may be implemented as or comprise an MVDR beamformer depending on the selected reference microphone.

The processing of the MVDR beamformer depends on a steering vector d, which contains the acoustic transfer function from the target sound to each of the microphones relative to the reference microphone.

For an MVDR beamformer, sound impinging from the target direction will be undistorted compared to the target sound picked up by the reference microphone in a particular frequency band. In other words, the processed sound (by the MVDR beamformer, i.e. the target signal) is undistorted compared to the selected reference microphone sound.

The target direction may be provided via a user interface. The hearing aid may comprise a user interface configured to allow the user to indicate a target direction, see e.g. FIG. 5.

The hearing aid may be configured to estimate the target direction. The hearing aid, e.g. a processor, may comprise an algorithm for estimating a direction (DOA) to a sound source (e.g. a target sound source) in the user's environment. The hearing aid may comprise a linear microphone array, which—when the hearing aid is operationally mounted—is configured to align the microphone direction with the front direction of the user.

The hearing aid may comprise a voice activity detector for estimating whether or not, or with what probability, an input signal comprises a voice signal at a given point in time. The voice activity detector may allow an adaptive estimation of the filter weights w based on noise covariance matrices ($R_v$, in the absence of speech) and transfer functions (d, when speech is detected).

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CT type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid comprises a directional microphone system, which may be adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device, e.g. a device comprising a local energy source, e.g. a battery, e.g. a rechargeable battery.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$(or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid adapted for being worn by a user at or in an ear of the user or to be partially or fully implanted in the user's head at an ear of the user, is furthermore provided by the present application. The hearing aid comprises at least two microphones. The method comprises providing by the at least two microphones at least two electric input signals representing sound around the user wearing the hearing aid;
converting the at least two electric input signals into signals as a function of time and frequency, e.g. represented by complex-valued time-frequency units;
providing a filtered signal in dependence of said at least two electric input signals and fixed or adaptively updated beamformer weights; and
defining at least one direction to a target sound source as a target direction.

The method may further comprise for each frequency band, selecting one of said at least two microphones—at a given point in time—as a reference microphone, thereby providing a reference input signal for each frequency band. The reference microphone for a given frequency band may be selected in dependence of directional data related to directional characteristics of said at least two microphones, at the given point in time, for target sound impinging on the hearing aid from the target direction at said given point in time The method may further comprise providing that the reference microphone is different for at least two frequency bands.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The directional data may comprise a directivity index or a front-back ratio.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing Aid System:

In a further aspect, a hearing aid system adapted for being worn by a user, the hearing aid system comprising at least one hearing aid and at least one further device, is moreover provided. The hearing aid system further comprises

- at least two microphones, providing respective at least two electric input signals representing sound around the user wearing the hearing aid system;
- a filter bank converting the at least two electric input signals into signals as a function of time and frequency, e.g. represented by complex-valued time-frequency units;
- a directional system connected to said at least two microphones and being configured to provide a filtered signal in dependence of said at least two electric input signals and fixed or adaptively updated beamformer weights; and
- transceiver circuitry for establishing a communication link allowing data to be exchanged between the hearing aid and the at least one further device.

The hearing aid system may be configured to provide that

- at least one direction to a target sound source is defined as a target direction,
- for each frequency band, one of said at least two microphones—at a given point in time—is selected as a reference microphone, thereby providing a reference input signal for each frequency band.

The reference microphone for a given frequency band may be selected in dependence of directional data related to directional characteristics of said at least two microphones, at the given point in time, for target sound impinging on the hearing aid from the target direction at said given point in time.

The reference microphone may be different for at least two frequency bands.

The directional data may comprise a directivity index or a front-back ratio.

The at least one further device may comprise a second hearing aid. Each of the first and second hearing aids may comprise at least one of the at least two microphones.

The at least one further device may comprise, or be configured to exchange data with, an auxiliary device comprising a user interface for the hearing aid system. The auxiliary device may be constituted be constituted by or comprise a portable communication device, e.g. a telephone, such as a smartphone, a smartwatch, or a tablet computer. The hearing system may be configured to allow data to be exchanged between the user interface of the auxiliary device and the (first) hearing aid and/or second hearing aid.

The hearing aid system may comprise the first and second hearing aids and an auxiliary device. Alternatively, the hearing aid system may comprise the first and second hearing aids and be configured to exchange data with an auxiliary device.

A binaural hearing aid system is furthermore provided by the present application. The binaural hearing aid system comprises a first hearing aid as described above, in the 'detailed description of embodiments' and in the claims, and a second hearing aid as described above, in the 'detailed description of embodiments' and in the claims. The first and second hearing aids are configured as a binaural hearing aid system allowing data to be exchanged between the first and second hearing aids.

The reference microphone may be selected in dependence of the intended application of the filtered signal. Different intended applications of the filtered signal may include a) own voice detection, b) own voice estimation, c) keyword detection, d) target signal cancellation, target signal focus, noise reduction, etc.

The reference microphone may be selected independently in the first and second hearing aids. The binaural hearing aid system may be configured to select a reference microphone for the first hearing aid among the at least two microphones of the first hearing aid. Similarly, the binaural hearing aid system may be configured to select a reference microphone for the second hearing aid among the at least two microphones of the second hearing aid.

The binaural hearing aid system may comprise an auxiliary device. The binaural hearing aid system may be adapted to establish a communication link between the first and/or second hearing aids and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

An APP:

In a further aspect, a non-transitory application, termed an APP, is furthermore provided by the present disclosure. The APP comprises executable instructions configured to be executed on an auxiliary device to implement a user interface for a hearing aid or a hearing aid system or a binaural hearing aid system described above in the 'detailed description of embodiments', and in the claims. The APP may be configured to run on a cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
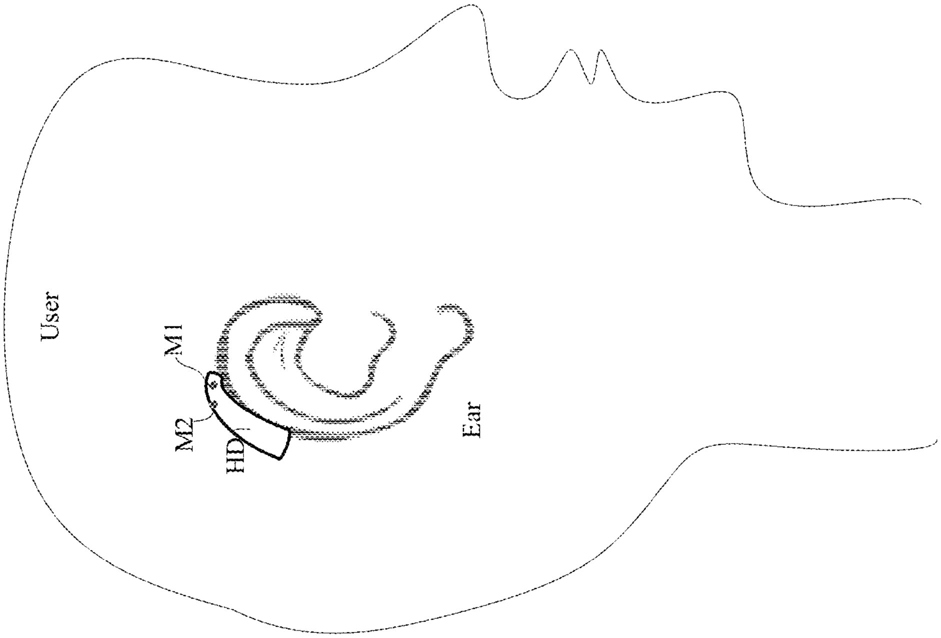
FIG. 1A shows a typical location of microphones in a behind the ear (BTE) hearing instrument.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

Embodiments of the disclosure may e.g. be useful in applications such as hearing aids or headsets.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, specifically to a hearing aid comprising a multitude (e.g. ≥2) of input transducers (e.g. microphones) and a directional system for providing a spatially filtered (beamformed) signal based on signals from the input transducers. In directionality, the noise is typically attenuated by use of beamforming. In MVDR (Minimum Variance Distortion-less Response) beamforming, e.g., the microphone signals are processed such that the sound impinging from a target direction at a chosen reference microphone is unaltered. A hearing instrument with directional noise reduction typically contains two or more microphones. The microphone location of different two-microphone instruments is illustrated in FIG. 1A, 1B.

Figure 1B:
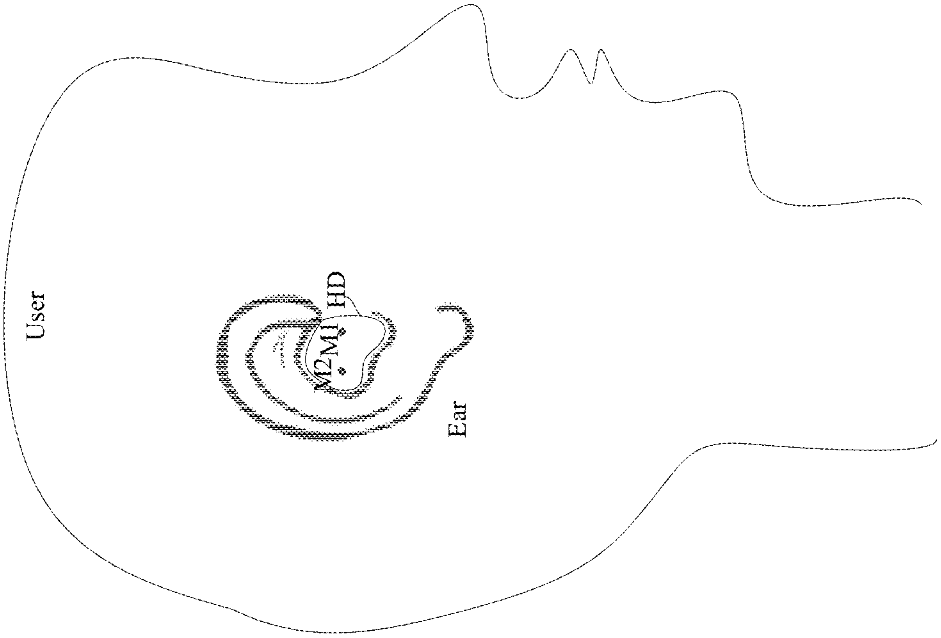
FIG. 1B shows a typical location of microphones in an in-the-ear (ITE) hearing instrument, FIGS. 2A, 2B and 2C schematically illustrates the difference between the front microphone directivity index and the rear microphone directivity index for three, respectively, different target directions, FIGS. 3A, 3B and 3C schematically illustrates the selection of the reference microphone based on the highest directivity index for three, respectively, different target directions.

FIG. 1A shows a typical location of microphones in a behind the ear (BTE) hearing instrument (HD), and FIG. 1B shows a typical location of microphones in an in-the-ear (ITE) hearing instrument (HD). In both cases a user (User) wears the hearing instrument (HD) at an ear (Ear), e.g. behind pinna, or at or in the ear canal, respectively.

The hearing aid microphones (M1, M2) are all located near the ear canal. E.g. behind the ear (FIG. 1A) or at the entrance to the ear canal (FIG. 1B) (or a combination thereof). In order to maintain the user's spatial localisation cues (such as interaural time and level differences between the ears, or even pinna-related localization cues), it is desirable to place the microphones close to the user's ear canal.

The microphones (M1, M2) are located in the hearing instrument so that M1 is closest to the front of the user and M2 is closest to the rear of the user. Hence, M1 is referred to as the front microphone and M2 is referred to as the rear microphone.

Due to the location near the head and pinna, the different microphones may have different directional characteristics. A directional characteristic can e.g. be measured in terms of the directivity index or front-back ratio or any other ratio between (signal content in) target direction and non-target directions.

The directivity index DI is given as the ratio between the response of the target direction $\theta_0$ and the response of all other directions:

$$DI(k) = \log_{10}\frac{|R(\theta_0, k)|^2}{\int |R(\theta, k)|^2 d\theta}$$

The front-back ratio FBR is the ratio between the responses of the front half plane and the responses of the back half plane:

$$FBR(k) = \log_{10}\frac{\int_{front} |R(\theta, k)|^2 d\theta}{\int_{back} |R(\theta, k)|^2 d\theta}$$

Other ratios than the front-back ratio may alternatively be used, e.g. a ratio between the magnitude response (e.g. power density) in a smaller angle range (<180°) in the target direction, and the magnitude response in a larger angle range (>180°, remaining) in non-target directions (or vice versa). The directivity index or the front-back ratio may be estimated for different types of isotropic noise fields such as a spherically isotropic noise field (noise equally likely from all directions) or a cylindrically isotropic noise field (noise field is equally likely in the horizontal plane). Typically, an isotropic noise field is only isotropic in absence of the head. An isotropic noise field may be altered by the head and the pinna such that the energy distribution no longer is the same across the uniformly sampled directions.

Figure 2A:
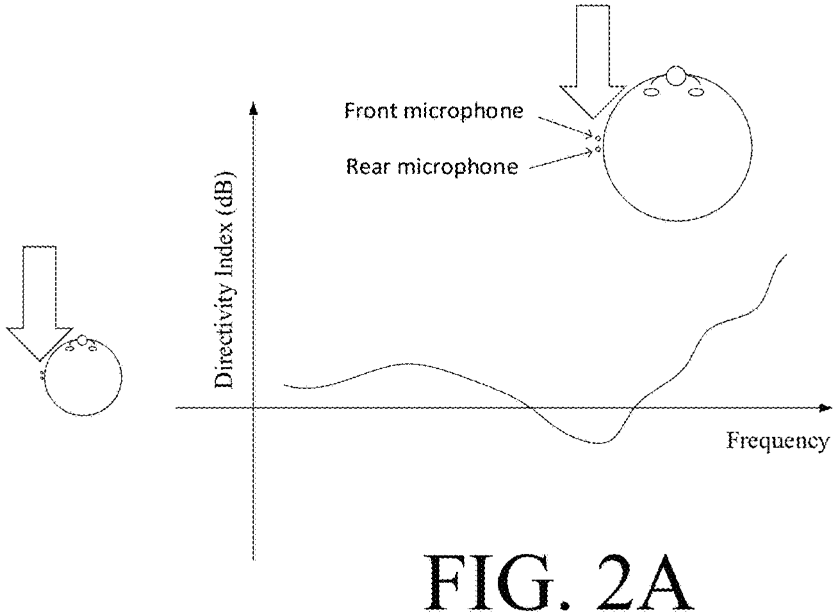
Figure 2B:
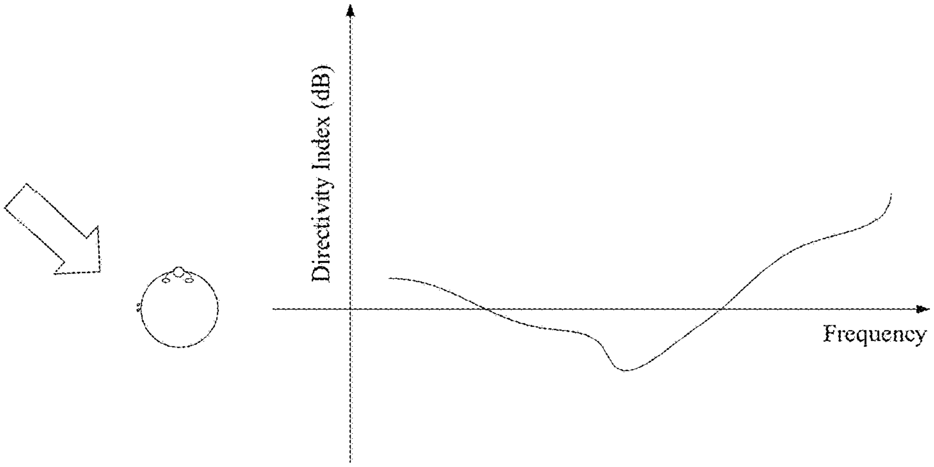
Figure 2C:
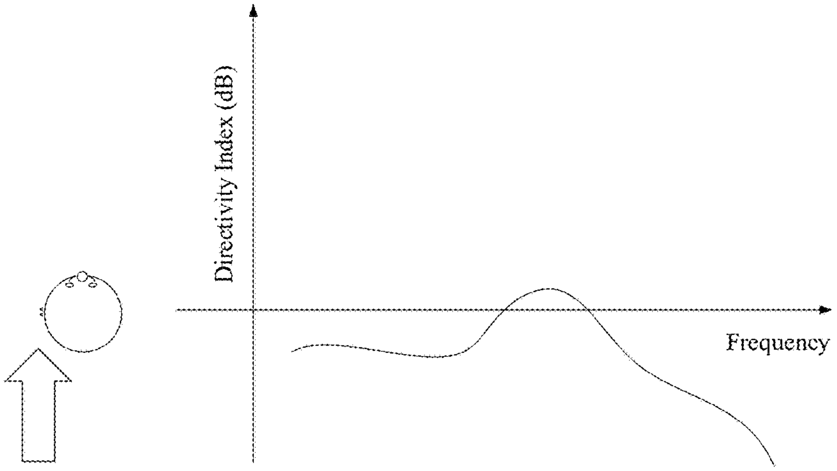

An example of the (frequency dependent) difference between the directivity index of the front microphone (M1) and the directivity index for the rear microphone (M2) for three different directions to a target sound source is shown in FIGS. 2A, 2B and 2C, respectively. Due to the placement of the microphones, e.g. behind the ear or near the ear canal, the directivity of the microphones is not the same. The location of the front and rear microphones relative to an orientation of the user's head (e.g. nose) is shown in the insert in the top right part of FIG. 2A. Due to the placement of the microphones, e.g. behind the ear or near the ear canal, the directivity of the microphones is not the same. The direction to the target sound source relative to the user is indicated in the small insert with a head and a block arrow to the left of the three graphs in FIGS. 2A, 2B and 2C. The target sound source is in front-half plane, directly in front of the user in FIG. 2A (+90°). The target sound source is in front half-plane, to the left of the user in FIG. 2B (~+135°). The target sound source is in rear half-plane, directly to the rear of the user in FIG. 2C (+270°).

It is clear from FIG. 2A, 2B, 2C that the microphone having the highest directivity depends on both the target direction as well as the frequency. It may thus be advantageous to select the reference microphone depending on the directivity characteristics of the microphones.

For the target impinging from the front, the front microphone (M1) typically has higher directivity, whereas the rear microphone (M2) typically has higher directivity when the target talker is behind the listener. We also notice that the microphone having the highest directivity changes across frequency.

As an alternative to using the directivity index, the transfer function between the microphones may be considered. For a given frequency band k, the reference microphone may be selected based on the microphone which picks up most energy form the target direction.

Normalized relative transfer functions $d_m(k)$ for propagation of sound from a given location to the M microphones (m=1, . . . , M) of the hearing aid (or hearing aid system) can be written in a vector $d=[d_1, d_2, \ldots, d_M]$ (sometimes termed 'steering vector' or look vector), in which the transfer function of the reference microphone (index m='ref') has the value $d_{ref}=1$, and all other elements of d (m≠'ref') has a magnitude smaller than one.

This may be an advantage in situations where the relative transfer function from the target direction (or the target directions) may be estimated adaptively during use.

The present disclosure proposes a method to select a reference microphone (or reference signal), where the selection of reference microphone (or reference signal) may vary across the target direction(s) and frequency bands.

The hearing aid may contain at least two microphones a filter bank converting the microphone signals into signals as function of time and frequency, e.g. complex-valued time-frequency units.

a directional system with a selected reference microphone for each frequency band.

access to data on the hearing instrument microphone's directional data.

a direction or a set of directions defined as target direction wherein the reference microphone for a given frequency band is selected based on the microphone's directional data In an embodiment the selected reference microphone is adaptive depending on an estimated target direction.

In an embodiment the selected reference microphone in a frequency band is the microphone having the highest directivity index for a given target direction or the highest ratio between the selected target directions and the selected noise directions.

In an embodiment the directional system is implemented as an MVDR beamformer.

Figure 3A:
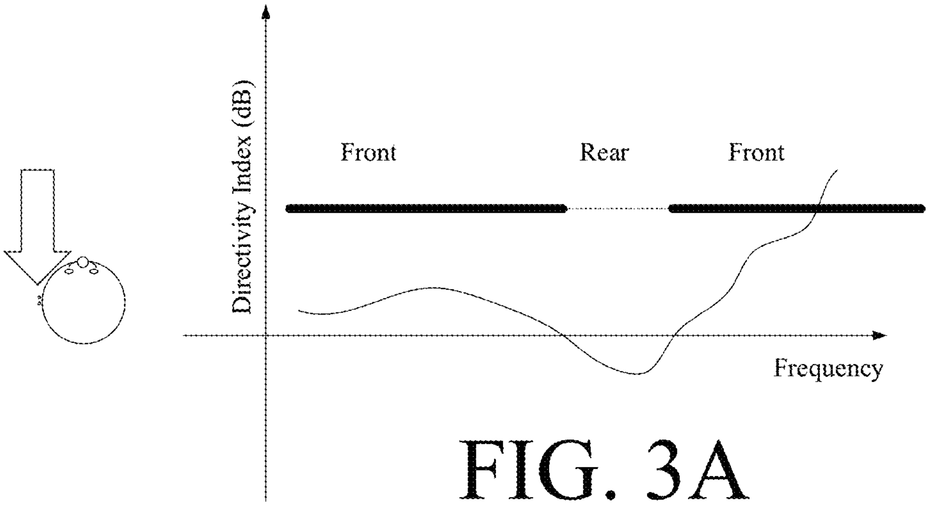
Figure 3B:
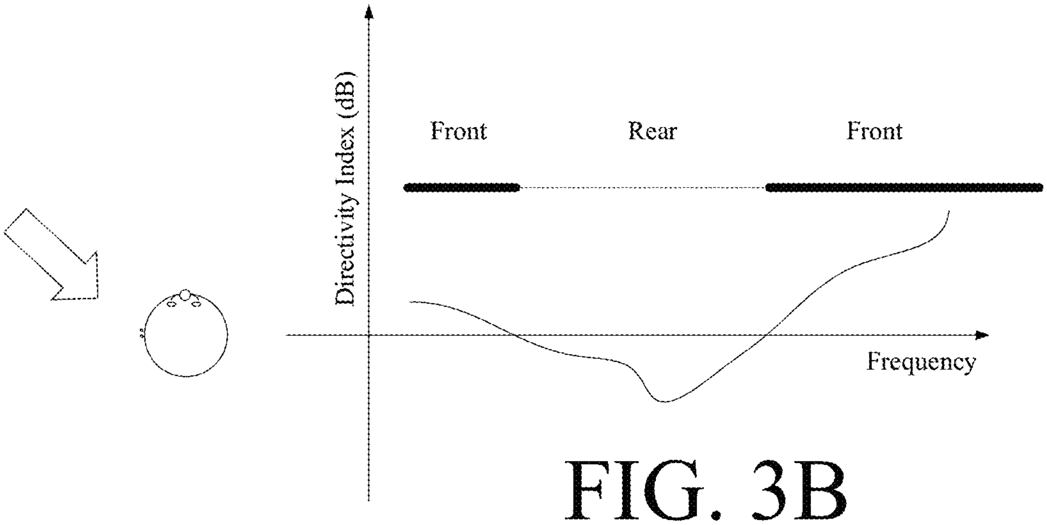
Figure 3C:
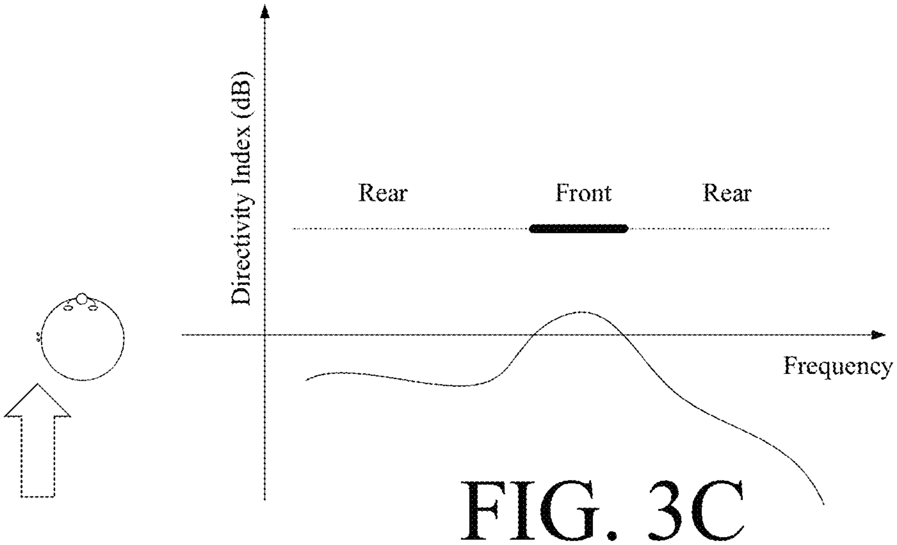

FIG. 3A, 3B, 3C shows a selection of the reference microphone based on the highest directivity index for three different target directions (same as in FIG. 2A, 2B, 2C). The bold line indicates the front microphone as the selected reference microphone; the dashed line indicates the rear microphone as selected reference microphone. In the schematic illustration of FIG. 3A, 3B, 3C, the reference microphone for a given frequency band and a given direction to the target sound source is chosen to be the microphone having the largest directivity index.

Figure 4:
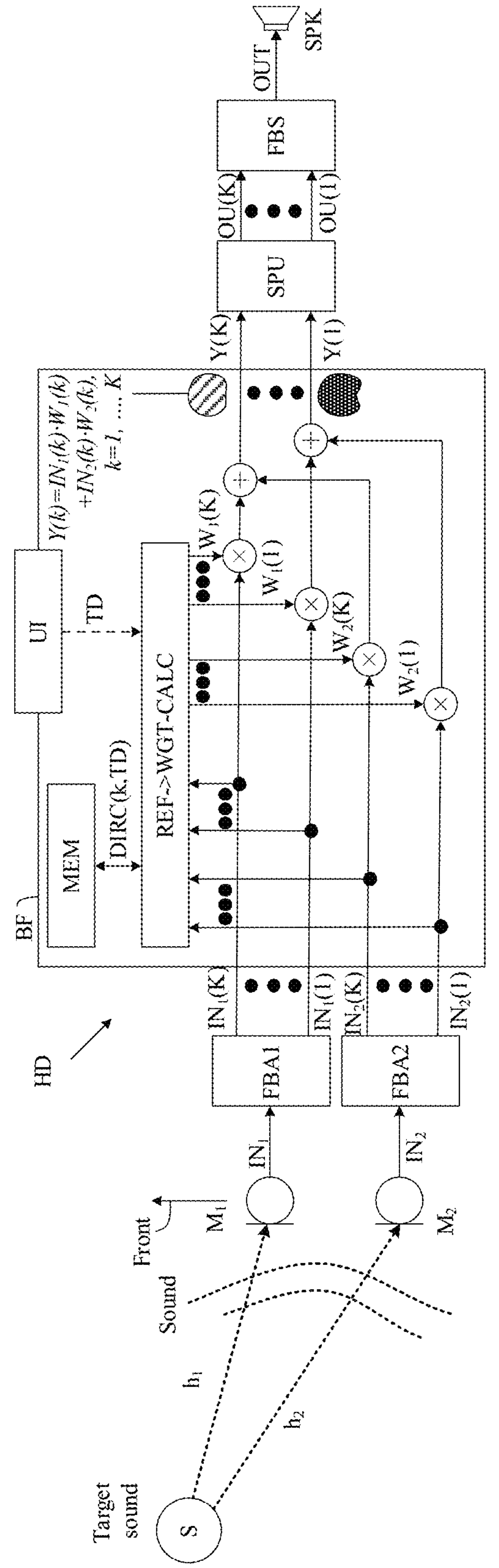
FIG. 4 shows a block diagram of an embodiment of a hearing aid according to the present disclosure.

FIG. 4 shows a block diagram of an embodiment of a hearing aid according to the present disclosure. The hearing aid (HD) comprises an exemplary two-microphone beamformer configuration (BF) according to the present disclosure. The hearing aid comprises first and second microphones ($M_1$, $M_2$) for converting an input sound (Sound) to first $IN_1$ and second $IN_2$ electric input signals, respectively. A front direction is e.g. defined by the microphone axis of the hearing aid when mounted on the user, as indicated in FIG. 4 by arrow denoted 'Front' coinciding with the microphone axis. The direction from the target signal (S, Target sound) to the hearing aid microphones ($M_1$, $M_2$) is indicated by dotted arrows denoted $h_1$ and $h_2$, respectively. The first and second microphones (when located at an ear of the user) are characterized by time-domain impulse responses $h_1$ ($h_1(\theta, \varphi, r)$) and $h_2$ ($h_2(\theta, \varphi, r)$), respectively (or transfer functions $H_1(\theta, \varphi, r, k)$ and $H_2(\theta, \varphi, r, k)$, respectively, in the frequency domain). The impulse responses ($h_1$, $h_2$) (or transfer functions ($H_1$, $H_2$)) are representative of acoustic properties of respective 'propagation channels' of sound from (target) sound source S located at (θ, φ, r) around the hearing aid to the first and second microphones ($M_1$, $M_2$) of the hearing aid (when mounted on the user). The embodiment of a hearing aid of FIG. 4 is configured to operate in the time-frequency domain. The hearing aid hence comprises first and second analysis filter bank units (FBA1 and FBA2) configured to convert the first and second time domain signals $IN_1$ and $IN_2$ to time-frequency domain signals $IN_m(k)$, m=1, 2, and k=1, . . . , K, where K is the number of frequency bands (and where the time index is omitted for simplicity). The number M of input transducers (e.g. microphones) may be larger than two.

The hearing aid (HD) further comprises a directional system (beamformer filter) (BF) for providing a beamformed signal Y(k) as a weighted combination of the first and second electric input signals IN1, IN2 using (generally complex) filter coefficients (also denoted beamformer weights) $W_1(k)$ and $W_2(k)$:$Y(k)=W_1(k)IN_1(k)+W_2(k)IN_2(k)$, k=1, . . . , K. In FIG. 4, the filter coefficients $W_1(k)$ and $W_2(k)$ are applied to the input signals $IN_1(k)$ and $IN_2(k)$, respectively, in respective multiplication units ('x'), k=1, . . . , K. Addition of terms ($W_1(k)IN_1(k)$ and $W_2(k)IN_2(k)$) having same frequency index is performed in respective summation units ('+'), k=1, . . . , K. The outputs of the K summation units provide the sub-band signals Y(k), k=1, . . . , K of the beamformed signal. The number K of frequency bands may e.g. be larger than one, e.g. in the range from 4 to 128.

The hearing aid (e.g. as here the directional system) comprises memory (MEM) comprising values of parameters which are relevant for controlling the directional system. At least some of the parameters may be predefined and stored prior to use of the hearing aid. At least some of the parameters may be updated and stored during use of the hearing aid. Directivity characteristics of the first and second microphones for different directions to the target sound source (cf. e.g. FIG. 2A, 2B, 2C) may be stored in the memory. The hearing aid (e.g. as here the directional system) may comprise a reference signal-and-beamformer weight-calculation unit (REF→WGT-CALC) for providing the beamformer weights ($W_1(k)$ and $W_2(k)$, k=1, . . . , K) in dependence of the directivity characteristics of the first and second microphones ($M_1$, $M_2$). The memory unit (MEM) may contain directivity characteristics of the first and second microphones for different directions (TD) to the target sound source (e.g. for each frequency band k=1, 2, . . . , K), cf. e.g. signal DIRC(k,TD) between the memory (MEM) and the REF→WGT-CALC-block. The directivity characteristics may e.g. comprise a directivity index (DI) or a front-back ratio (FBR) or similar parameter that can be determined as a frequency dependent indicator of directivity properties of a given microphone configuration. The reference signal for a given direction to the target sound source for a given frequency band k may be extracted from the directivity characteristics, e.g. based on predefined threshold values. The memory may include a reference-indicator REF(k,TD) for each direction (TD) to the target sound source for which directivity properties are stored, and for each frequency band (k). The reference indicator for the given target direction (TD) and frequency band (k) specify whether or not (or with what probability) a given microphone signal is the reference signal. Given the target direction (TD), the REF→WGT-CALC-block may read the corresponding DIRC(k,TD)-values or simply the reference-indicator REF(k,TD) for the given target direction from the memory (MEM).

Filter coefficients $W_1(k)$ and $W_2(k)$, k=1, . . . , K, for different directions to the target signal may be adaptively determined in dependence of first and second electric input signals ($IN_1(k)$, $IN_2(k)$), the target direction (θ) and the reference-indicator REF(k,θ) for the target direction (θ). The target direction (θ) at a given point in time may e.g. be provided via a user-interface (UI), cf. signal TD (shown by dashed arrow) from the user interface to the reference signal-and-beamformer weight-calculation unit (REF→WGT-CALC). The target direction at a given point in time may e.g. be adaptively estimated, e.g. in the reference signal-and-beamformer weight-calculation unit (REF→WGT-CALC), based on the first and second electric input signals ($IN_1(k)$, $IN_2(k)$) and signal statistics extracted therefrom (e.g. covariance matrices, acoustic transfer functions, etc., e.g. using a voice activity detector to classify a current acoustic environment to be able to estimate noise properties and speech properties of the current input signals), cf. e.g. EP2701145A1 or [Brandstein & Ward; 2001].

The weights may be calculated similarly to how the weights usually are found. E.g. for an MVDR beamformer $$W_{mvdr}(k) = \frac{\hat{R}_v^{-1}(k)\hat{d}(k)}{\hat{d}^H(k)\hat{R}_v^{-1}(k)\hat{d}(k)}$$

Where $\hat{R}_v$ is an estimate of the inter-microphone noise co-variance matrix $R_v$ and $\hat{d}$ is an estimate of the steering (or look) vector d for frequency band k. But the size of the weights will be dependent on how the relative transfer function d is scaled. It may, e.g., be an advantage if d is scaled such that its maximum magnitude value is 1, e.g. so that it is the maximum value of the individual components of d, e.g. $d=[1,z]^T$ or $d=[z,1]^T$ (for a 2-microphone configuration), where $|z|<1$. Hereby, the weights w become smaller, and the white noise gain (microphone noise) thus becomes smaller.

The beamformer weights may of course be optimized using other optimization criteria than those of the MVDR beamformer. E.g. the criteria of the more general linearly constrained minimum variance (LCMV) beamformer.

Another advantage is fading towards a reference microphone signal (for a given frequency band k, k=1, . . . , K) can be provided, in case noise reduction is not needed. A possible type of fading may be $$w_{applied}(k) = \alpha * w_{mvdr}(k) + (1-\alpha) * w_{ref}(k), \text{ where}$$

$w_{applied}(k)$ is the weight vector applied to the microphones, $w_{mvdr}(k)$ is the weight vector estimated in order to apply maximum noise reduction, $w_{ref}(k)$ is a vector containing zeros at all indices apart from the reference microphone (which has the value 1) and α is a value between 0 (resulting in the reference microphone signal) and 1 (resulting in maximum noise reduction). The fading weight α may be constant over frequency. It may, however, also be frequency dependent (α(k)).

The hearing aid of FIG. 4 comprises a 2-microphone beamformer configuration comprising a signal processor (SPU) for (further) processing the beamformed signal Y(k) in a number (K) of frequency bands and providing a processed signal OU(k), k=1, 2, . . . , K. The signal processor may be e.g. be configured to apply one or more processing algorithms to a signal of the forward path, e.g. to apply a level and frequency dependent shaping of the beamformed signal, e.g. to compensate for a user's hearing impairment. The processed frequency band signals OU(k) are fed to a synthesis filter bank FBS for converting the frequency band signals OU(k) to a single time-domain processed (output) signal OUT, which is fed to an output unit for presentation to a user as a signal perceivable as sound. In the embodiment of FIG. 4, the output unit comprises a loudspeaker (SPK) for presenting the processed signal (OUT) to the user as sound (e.g. air borne vibrations). The forward path from the microphones ($M_{BTE1}$, $M_{BTE2}$) to the loudspeaker (SPK) of the hearing aid is (mainly) operated in the time-frequency domain (in K frequency bands).

Figure 5:
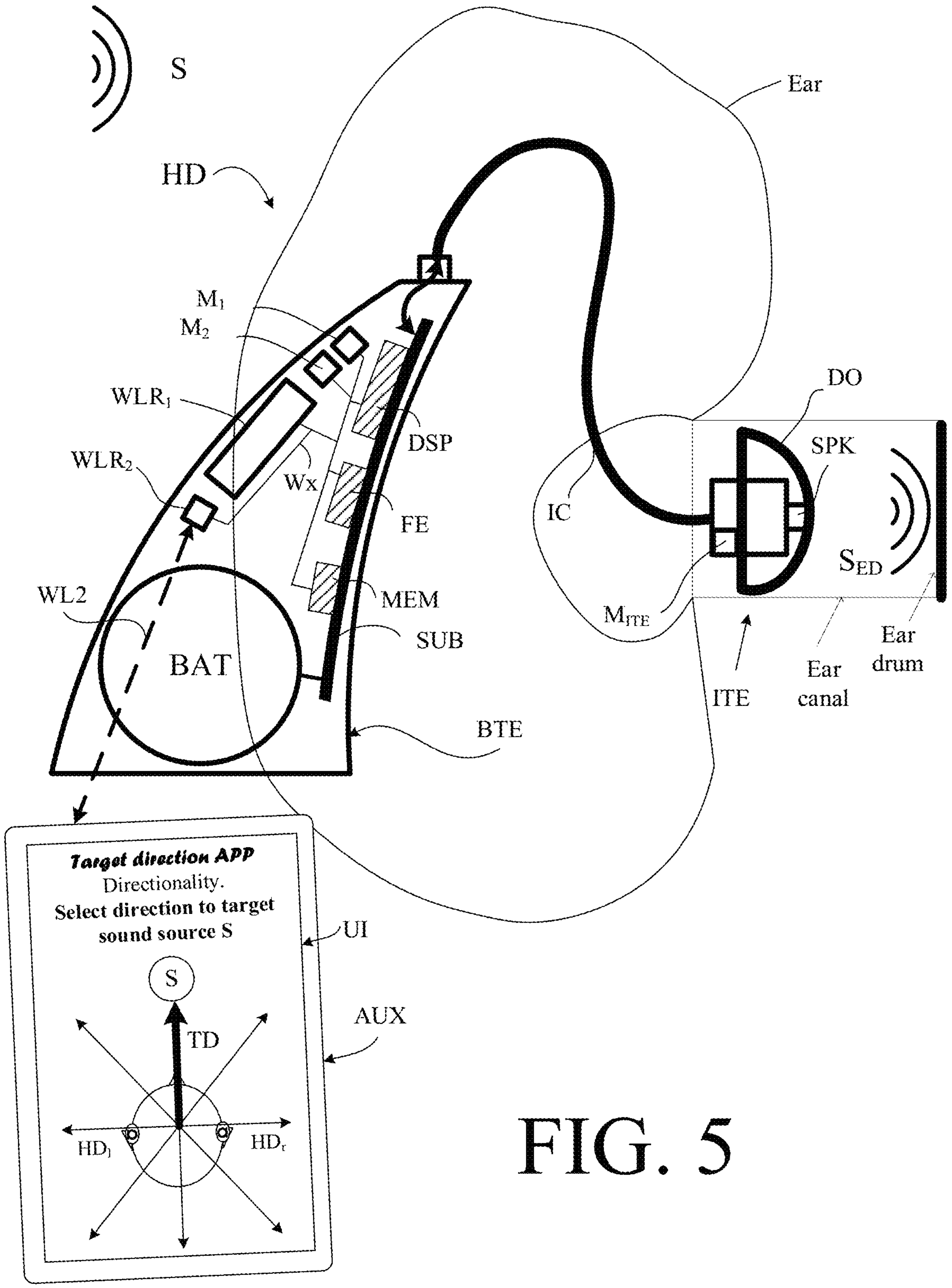
FIG. 5 shows an embodiment of a hearing aid according to the present disclosure comprising a BTE-part located behind an ear or a user and an ITE part located in an ear canal of the user in communication with an auxiliary device comprising a user interface for the hearing aid.

FIG. 5 shows an embodiment of a hearing aid according to the present disclosure comprising a BTE-part located behind an ear or a user and an ITE part located in an ear canal of the user in communication with an auxiliary device comprising a user interface for the hearing aid.

FIG. 5 shows an embodiment of a hearing device (HD), e.g. a hearing aid, according to the present disclosure comprising a BTE-part located behind an ear or a user and an ITE part located in an ear canal of the user in communication with an auxiliary device (AUX) comprising a user interface (UI) for the hearing device. FIG. 5 illustrates an exemplary hearing aid (HD) formed as a receiver in the ear (RITE) type hearing aid comprising a BTE-part (BTE) adapted for being located at or behind pinna and a part (ITE) comprising an output transducer (e.g. a loudspeaker/receiver) adapted for being located in an ear canal (Ear canal) of the user (e.g. exemplifying a hearing aid (HD) as shown in FIG. 4). The BTE-part (BTE) and the ITE-part (ITE) are connected (e.g. electrically connected) by a connecting element (IC). In the embodiment of a hearing aid of FIG. 5, the BTE part (BTE) comprises two input transducers (here microphones) ($M_1$, $M_2$) each for providing an electric input audio signal representative of an input sound signal from the environment (in the scenario of FIG. 5, including sound source S). The hearing aid of FIG. 5 further comprises two wireless receivers or transceivers ($WLR_1$, $WLR_2$) for providing respective directly received auxiliary audio and/or information/control signals (and optionally for transmitting such signals to other devices). The hearing aid (HD) comprises a substrate (SUB) whereon a number of electronic components are mounted, functionally partitioned according to the application in question (analogue, digital, passive components, etc.), but including a signal processor (DSP), a front-end chip (FE), and a memory unit (MEM) coupled to each other and to input and output units via electrical conductors Wx. The mentioned functional units (as well as other components) may be partitioned in circuits and components according to the application in question (e.g. with a view to size, power consumption, analogue vs digital processing, radio communication, etc.), e.g. integrated in one or more integrated circuits, or as a combination of one or more integrated circuits and one or more separate electronic components (e.g. inductor, capacitor, etc.). The signal processor (DSP) provides an enhanced audio signal (cf. signal OUT in FIG. 4), which is intended to be presented to a user. In the embodiment of a hearing aid device in FIG. 5, the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). The ITE-part may further comprise an input unit comprising one or more input transducer (e.g. a microphone) ($M_{ITE}$) for providing an electric input audio signal representative of an input sound signal from the environment at or in the ear canal. In another embodiment, the hearing aid may comprise only the BTE-microphones ($M_1$, $M_2$). In yet another embodiment, the hearing aid may comprise an input unit (e.g. a microphone or a vibration sensor) located elsewhere than at the entrance of the ear canal (e.g. facing the eardrum) in combination with one or more input units located in the BTE-part and/or the ITE-part. The ITE-part further comprises a guiding element, e.g. a dome, (DO) for guiding and positioning the ITE-part in the ear canal of the user.

The hearing aid (HD) exemplified in FIG. 5 is a portable device and further comprises a battery (BAT) for energizing electronic components of the BTE- and ITE-parts.

The hearing aid (HD) comprises a directional microphone system (beamformer filter (BF in FIG. 4)) adapted to enhance a target acoustic source among a multitude of acoustic sources in the local environment of the user wearing the hearing aid device. The memory unit (MEM) may comprise predefined (or adaptively determined) complex, frequency dependent constants defining predefined or (or adaptively determined) 'fixed' beam patterns, directivity data, e.g. reference-indicators, etc., according to the present disclosure, together defining or facilitating the calculation or selection of appropriate beamformer weights and thus the beamformed signal Y(k) in dependence of the current electric input signals (cf. e.g. FIG. 4).

The hearing aid of FIG. 5 may constitute or form part of a hearing aid and/or a binaural hearing aid system according to the present disclosure.

The hearing aid (HD) according to the present disclosure may comprise a user interface UI, e.g., as shown in the lower part of FIG. 5, implemented in an auxiliary device (AUX), e.g. a remote control, e.g. implemented as an APP in a smartphone or other portable (or stationary) electronic device. In the embodiment of FIG. 5, the screen of the user interface (UI) illustrates a Target direction APP. A direction (TD) to the present target sound source (S) of interest to the user may be selected from the user interface, e.g. by dragging the sound source symbol (S) to a currently relevant direction relative to the user. The currently selected target direction is the frontal direction as indicated by the bold arrow (denoted TD) to the sound source S. The auxiliary device (AUX) and the hearing aid are adapted to allow communication of data representative of the currently selected direction to the hearing aid via a, e.g. wireless, communication link (cf. dashed arrow WL2 to wireless transceiver $WLR_2$ in FIG. 8). The communication link WL2 may e.g. be based on far field communication, e.g. Bluetooth or Bluetooth Low Energy (or similar technology), implemented by appropriate antenna and transceiver circuitry in the hearing aid (HD) and the auxiliary device (AUX), indicated by transceiver unit $WLR_2$ in the hearing aid. Other aspects related to the control of hearing aid (e.g. the beamformer) may be made selectable or configurable from the user interface (UI).

Figure 6:
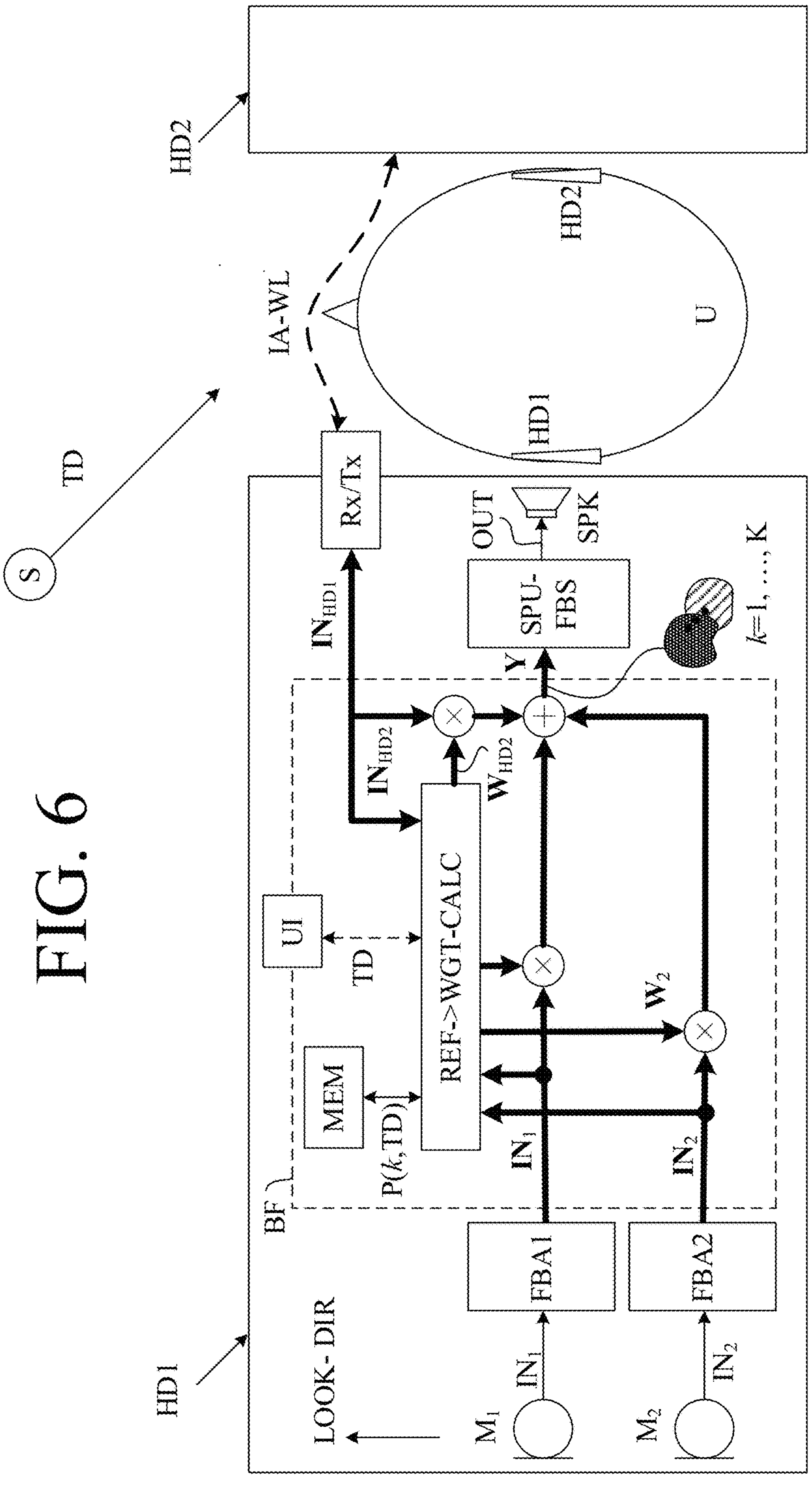
FIG. 6 shows an embodiment of a binaural hearing aid system according to the present disclosure.

FIG. 6 shows an embodiment of a binaural hearing aid system according to the present disclosure. The hearing aid system may be adapted for being worn by a user (U). The hearing aid system comprises first and second hearing aids (HD1, HD2), each being adapted to be located at or in an ear of the user. Each of the first and second hearing aids comprises at least two (here two) microphones ($M_1$, $M_2$), providing respective first and second (e.g. digitized) electric input signals ($IN_1$, $IN_2$) representing sound around the user (U) wearing the hearing aid system. The first and second microphones ($M_1$, $M_2$) may form part of a linear or non-linear microphone array. In the embodiment of FIG. 6, the first and second microphones ($M_1$, $M_2$) define a microphone axis, which, when the hearing aid (HD1, HD2) is mounted on the user at an ear (cf. schematic user (U) between the first and second hearing aids) is parallel to a look direction (cf. arrow denoted LOOK-DIR) of the user (U). Each of the first and second hearing aids (HD1, HD2) comprises first and second analysis filter banks (FBA1, FBA2) for converting the at least two electric input signals ($IN_1$, $IN_2$) into frequency sub-band signals ($IN_1$, $IN_2$) as a function of time (l) and frequency (k), e.g. represented by complex-valued time-frequency units (k,l) arranged in consecutive time frames, each time frame comprising a spectrum of the signal at a specific time l'. A spectrum at a given time l' may e.g. comprise complex values (magnitude and phase) of the signal at a number of frequencies k=1, . . . , K, where K is the number of frequency bins in the spectrum (e.g. provided by a Fourier transform algorithm). Each of the first and second hearing aids (HD1, HD2) comprises a directional system (BF, beamformer filter) receiving the two electric input signals ($IN_1$, $IN_2$) from microphones ($M_1$, $M_2$) of the hearing aid itself and at least one further electric input signal ($IN_{HD2}$, e.g. a signal from a microphone or a beamformed signal), received via a wireless link (cf. dashed double arrow denoted IA-WL) from the other hearing aid of the hearing aid system (or via a wireless link (e.g. WL2 in FIG. 5) from another device (e.g. AUX in FIG. 5), e.g. a smartphone, in communication with the hearing aid in question). The directional system (BF) is configured to provide a filtered signal Y in dependence of said at least three electric input signals ($IN_1$, $IN_2$, $IN_{HD2}$) and fixed or adaptively updated beamformer weights ($W_1$, $W_2$, $W_{HD2}$). Each of the first and second hearing aids (HD1, HD2) comprises appropriate transceiver circuitry (Rx/Tx) for establishing a communication link (IA-WL) allowing data (e.g. including audio data $IN_{HD1}$, $IN_{HD2}$) to be exchanged between the first and second hearing aids (HD1, HD2), e.g. including one or more microphone signals ($IN_1$, $IN_2$) or combinations thereof, in the form of one or more spatially filtered signal(s) (or parts thereof, e.g. selected frequency ranges thereof). The hearing aid system is configured to provide that at least one direction (TD) to a target sound source is defined as a target direction (and provided via a user interface (UI) (cf. signal TD and dashed arrow between user interface (UI) and block REF→WGT-CALC) and/or estimated by an algorithm of the hearing aid (e.g. in block REF→WGT-CALC). A multitude of algorithms for estimating a direction of arrival (DOA) of a target (speech) signal have been proposed in the prior art (see e.g. EP3413589A1). The directional system (BF) comprises a reference signal-and-beamformer weight-calculation unit (REF→WGT-CALC) configured to select a reference a reference input signal for each frequency band (k, k=1, . . . , K) among the at least three electric input signals ($IN_1$, $IN_2$, $IN_{HD2}$) (and to adaptively update such selection over time in dependence of a current direction to the target signal source). The hearing aid (e.g. the directional system (BF) may comprise a voice activity detector for estimating whether or not, or with what probability, an input signal comprises a voice signal at a given point in time. Thereby an adaptive estimation of the frequency dependent filter weights W (for an exemplary MVDR beamformer) based on noise covariance matrices ($R_v$, in the absence of speech) and transfer functions (d, when speech is detected) can be provided:

$$W_{mvdr}(k) = \frac{\hat{R}_v^{-1}(k)\hat{d}(k)}{\hat{d}^H(k)\hat{R}_v^{-1}(k)\hat{d}(k)}$$

where $\hat{R}_v$ (k) is an estimate of the inter-microphone noise co-variance matrix $R_v$ frequency band k, and $\hat{d}$(k) is an estimate of the steering (or look) vector d for frequency band k. The hearing aid (e.g. the directional system (BF)) is configured to continuously update the selection of reference signal (and the filter coefficients) in dependence of the current electric input signals (and thus of the direction to the target sound source of current interest of the user). The direction to the target signal may be provided by the user via a user-interface and/or adaptively determined by the hearing aid, e.g. based on the electric input signals and the voice activity detector. The reference microphone signal for a given frequency band k may be determined according to a specific (e.g. logic) criterion, e.g. in dependence of directional data of the respective physical or virtual microphones, or in dependence of estimates of the acoustic transfer functions d(k) for the current target direction (TD), cf. also arrow denoted TD from target signal source (TD) to the user (U). Frequency dependent directional data (e.g. directivity index, or front-back-ratio) or estimates of the acoustic transfer functions d(k) (e.g. relative acoustic transfer functions) for a number of predefined target directions (TD) may be stored in a memory (MEM) of the hearing aid (or be accessible in an external database via a communication link) for use in estimation of the reference microphone signal in a given frequency band and for subsequent determination of filter weights W(k), cf. signal P(k,TD) between memory (MEM) and the reference signal-and-beamformer weight-calculation unit (REF→WGT-CALC). The target direction (TD) may be indicated as an angle θ in a horizontal plane (e.g. through the ears of the user) from a center of the user's head to the target sound source (S) of current interest to the user (U).

In the embodiment of FIG. 6, the reference signal-and-beamformer weight-calculation unit (REF→WGT-CALC) of the first hearing aid (HD1) is configured to determine filter weights $W_1$, $W_2$, $W_{HD2}$. And to apply the weights to respective electric input signals $IN_1$, $IN_2$, $IN_{HD2}$ via respective combination units (multiplication units 'x'). The resulting weighted signals are combined in a combination unit ('sum-unit''+'), thereby providing filtered (beamformed) signal Y. The reference signal-and-beamformer weight-calculation unit (REF→WGT-CALC) of the second hearing aid (HD2) is configured to correspondingly provide filter weights $W_1$, $W_2$, $W_{HD1}$, where he filter weights are applied to the (local) input signals $IN_1$, $IN_2$, and to signal $IN_{HD1}$ received from the first hearing aid.

The (frequency dependent) spatially filtered (beamformed) signal Y may be further processed in a hearing aid signal processor (SPU) of the forward path, e.g. adapted to a hearing impairment of the user (at the ear in question). The frequency dependency of the filtered signal Y is schematically indicated by differently hatched beamformers denoted k=1, . . . , K associated with Y. The forward path further comprises a synthesis filter bank (FBS) for converting the band-split (frequency domain) processed signal to a processed time-domain signal (OUT) that is fed to an output transducer (possibly after digital to analogue conversion, as appropriate), here loudspeaker (SPK), for presentation as stimuli perceivable by the user (U) as sound (here acoustic stimuli).

In the embodiment of FIG. 6, the first and second hearing aids (HD1, HD1) may be identical, possibly except for specific adaptation to the left and right ears of the user (e.g. according to possible different hearing profiles of the left and right ears of the user resulting in differently parameterized compression algorithms (and possibly other algorithms) applied in the hearing aid signal processor (SPU) of the forward path).

Instead of selecting the reference microphone signal in dependence of microphone location characteristics (as e.g. directional data or acoustic transfer functions), the hearing aid or the (possibly binaural) hearing aid system may be adapted (e.g. in a specific mode of operation, e.g. selected from a user interface (UI)) to select the reference microphone in dependence of the intended application of the filtered signal Y. Different intended applications of the filtered signal may e.g. include a) own voice detection, b) own voice estimation, c) keyword detection, d) target signal cancellation, target signal focus, noise reduction, etc.

Further, the binaural hearing aid system may be adapted (e.g. in a specific 'monaural mode of operation, e.g. entered via a user interface (UI)) to select the reference microphone (or reference microphone signal) independently in the first and second hearing aids (e.g. only selecting among 'its own microphones').

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. The described idea of allowing the selection of a reference microphone (or reference signal) from an array of microphones in connection with a beamformer to vary over frequency bands (k) is exemplified above by a single hearing aid. The concept may, however, as well be applied to a binaural hearing aid system or a system containing external microphones (e.g. located in one or more external devices, e.g. in a smartphone). Different combinations of reference microphones may depend on the application of the beamformed signal (left ear may select a reference microphone only within the left-hearing instrument microphones, similarly for right ear. Further, a beamformed signal used for detection (e.g. keywords) may select between all available microphones in the microphone array.

REFERENCES

EP3229489A1 (Oticon) 11 Oct. 2017
EP2701145A1 (Retune, Oticon) 26 Feb. 2014.
[Brandstein & Ward; 2001] M. Brandstein and D. Ward, "Microphone Arrays", Springer 2001.
EP3413589A1 (Oticon) 12 Dec. 2018

The invention claimed is:

1. A binaural hearing aid system adapted for being worn by a user, wherein the binaural hearing aid system comprises a first hearing aid and a second hearing aid, each of the first hearing aid and a second hearing aid being adapted to be located at or in an ear of the user, each of the first hearing aid and the second hearing aid comprising:

at least two microphones, providing respective at least two electric input signals representing sound around the user wearing the respective hearing aid;

a filter bank converting the at least two electric input signals into signals as a function of time and frequency;

transceiver circuitry establishing a communication link allowing data to be exchanged between the first hearing aid and the second hearing aid, the data comprising at least one further electric input signal; and a directional system in communication with the at least two microphones and the transceiver circuitry, the directional system being configured to provide a filtered signal in dependence of the at least two electric input signals, the at least one further electric input signal, and beamformer weights;

wherein the binaural hearing aid system is configured to:

provide that a direction to a target sound of each of the first hearing aid and the second hearing aid is defined as a target direction;

select, for each frequency band, one of the at least two microphones of the first hearing aid as a first reference microphone, and provide a first reference input signal for each frequency band, wherein the first reference microphone for a given frequency band is selected in dependence of directional data related to directional characteristics of the at least two microphones of the first hearing aid for target sound impinging on the first hearing aid from the target direction of the first hearing aid; and select, for each frequency band, one of the at least two microphones of the second hearing aid as a second reference microphone, and provide a second reference input signal for each frequency band, wherein the second reference microphone for a given frequency band is selected in dependence of directional data related to directional characteristics of the at least two microphones of the second hearing aid for target sound impinging on the second hearing aid from the target direction of the second hearing aid.

2. A binaural hearing aid system according to claim 1, wherein the target direction of each of the first hearing aid and the second hearing aid is fixed, and wherein each of the first reference microphone and the second reference microphone is selected in advance of operation.

3. A binaural hearing aid system according to claim 1, wherein each of the first reference microphone and the second reference microphone for a given frequency band is adaptively selected.

4. A binaural hearing aid system according to claim 3, wherein each of the first reference microphone and the second reference microphone for a given frequency band is adaptively selected based on a logic criterion.

5. A binaural hearing aid system according to claim 1, wherein each of the first hearing aid and the second hearing aid comprises:

a memory or circuitry for establishing a communication link to a database, the database comprising the directional data related to directional characteristics of the at least two microphones.

6. A binaural hearing aid system according to claim 1, wherein the directional data related to directional characteristics of the at least two microphones of each of the first hearing aid and the second hearing aid comprise a directivity index or a front-back ratio.

7. A binaural hearing aid system according to claim 6, wherein the first reference microphone for a given frequency band is selected as the microphone exhibiting maximum directivity index or maximum front-back-ratio for the target sound impinging on the first hearing aid from the target direction of the first hearing aid, and wherein the second reference microphone for a given frequency band is selected as the microphone exhibiting maximum directivity index or maximum front-back-ratio for the target sound impinging on the second hearing aid from the target direction of the second hearing aid.

8. A binaural hearing aid system according to claim 1, wherein the at least one further electric input signal exchanged between the first hearing aid and the second hearing aid comprises one or more of: the at least two electric input signals, and the filtered signal.

9. A binaural hearing aid system according to claim 1, wherein the directional system of each of the first hearing aid and the second hearing aid is implemented as or comprises a minimum variance distortionless response (MVDR) beamformer depending on the selected reference microphone, for each frequency band, of the respective hearing aid.

10. A binaural hearing aid system according to claim 1, wherein the target direction of each of the first hearing aid and the second hearing aid is provided via a user interface.

11. A binaural hearing aid system according to claim 1, wherein the binaural hearing aid system is configured to estimate the target direction of each of the first hearing aid and the second hearing aid.

12. A binaural hearing aid system according to claim 1, the binaural hearing aid system further comprising a voice activity detector for estimating whether or not, or with what probability, an input signal comprises a voice signal at a given point in time.

13. A binaural hearing aid system according to claim 1, each of the first hearing aid and the second hearing aid being constituted by or comprising an air-conduction type hearing aid, a bone-conduction type hearing aid, a cochlear implant type hearing aid, or a combination thereof.

14. A binaural hearing aid system adapted for being worn by a user, wherein the binaural hearing aid system comprises a first hearing aid and a second hearing aid, each of the first hearing aid and a second hearing aid being adapted for being worn by a user at or in an ear of the user or to be partially or fully implanted in the user's head at an ear of the user, each of the first hearing aid and the second hearing aid comprising at least two microphones, providing respective at least two electric input signals representing sound around the user wearing the respective hearing aid;

a filter bank converting the at least two electric input signals into signals as a function of time and frequency, e.g. represented by complex-valued time-frequency units;

transceiver circuitry establishing a communication link allowing data to be exchanged between the first hearing aid and the second hearing aid, the data comprising at least one further electric input signal; and a directional system in communication with the at least two microphones and the transceiver circuitry, the directional being configured to provide a filtered signal in dependence of the at least two electric input signals, the at least one further electric input signal, and beamformer weights;

wherein the binaural hearing aid system is configured to:

provide that a direction to a target sound of each of the first hearing aid and the second hearing aid is defined as a target direction;

select, for each frequency band, one of the at least two microphones of the first hearing aid as a first reference microphone, and provide a first reference input signal for each frequency band, wherein the first reference microphone for a given frequency band is adaptively selected based on a logic criterion, wherein the logic criterion comprises a comparison of first estimated acoustic transfer functions, each of the first estimated acoustic transfer functions being indicative of a transfer function between the target direction of the first hearing aid and a respective microphone of the at least two microphones of the first hearing aid, wherein for a given frequency band, the first reference microphone is selected as the microphone exhibiting the largest first acoustic transfer function of the first estimated acoustic transfer functions in the given frequency band; and select, for each frequency band, one of the at least two microphones of the second hearing aid as a second reference microphone, and provide a second reference input signal for each frequency band, wherein the second reference microphone for a given frequency band is adaptively selected based on a logic criterion, wherein the logic criterion comprises a comparison of second estimated acoustic transfer functions, each of the second estimated acoustic transfer functions being indicative of a transfer function between the target direction of the second hearing aid and a respective microphone of the at least two microphones of the second hearing aid, wherein for a given frequency band, the second reference microphone is selected as the microphone exhibiting the largest second acoustic transfer function of the second estimated acoustic transfer functions in the given frequency band.

15. A binaural hearing aid system according to claim 14, wherein the directional system of each of the first hearing aid and the second hearing aid is implemented as or comprise a minimum variance distortionless response beamformer depending on the selected reference microphone, for each frequency band, of the respective hearing aid.

16. A binaural hearing aid system according to claim 14, wherein the target direction of each of the first hearing aid and second hearing aid is provided via a user interface.

17. A binaural hearing aid system according to claim 14, wherein the binaural hearing aid system is configured to estimate the target direction of each of the first hearing aid and second hearing aid.

18. A binaural hearing aid system according to claim 14, wherein the target direction of each of the first hearing aid and second hearing aid is fixed.

19. A binaural hearing aid system according to claim 14, wherein for a given frequency band:

the first reference microphone is selected as the microphone which picks up most energy from the target direction of the first hearing aid; and the second reference microphone is selected as the microphone which picks up most energy from the target direction of the second hearing aid.

20. A binaural hearing aid system according to claim 14, wherein, for a given frequency band:

the first reference microphone is selected as the microphone which has the largest first acoustic transfer function for the target direction of the first hearing aid, the largest first acoustic transfer function being determined as the largest magnitude among the elements of the first acoustic transfer functions; and the second reference microphone is selected as the microphone which has the largest second acoustic transfer function for the target direction of the second hearing aid, the largest relative transfer function being determined as the largest magnitude among the elements of the second acoustic transfer functions.

* * * * *